United States Patent [19]

Olsen

[11] Patent Number: 5,508,596
[45] Date of Patent: Apr. 16, 1996

[54] MOTION CONTROL WITH PRECOMPUTATION

[75] Inventor: John H. Olsen, Vashon, Wash.

[73] Assignee: Omax Corporation, Auburn, Wash.

[21] Appl. No.: 134,174

[22] Filed: Oct. 7, 1993

[51] Int. Cl.[6] ................................................ G05B 19/18
[52] U.S. Cl. ...................... 318/567; 364/474.16; 388/814
[58] Field of Search ................................ 318/607, 560, 318/561, 567–574, 606–610; 388/805, 814, 820, 832; 364/474.06, 474.11, 474.12, 474.14, 474.15, 474.16, 474.17, 474.21, 474.28–474.31

[56] References Cited

U.S. PATENT DOCUMENTS

| | | | |
|---|---|---|---|
| Re. 30,132 | 10/1979 | Irie | 318/571 X |
| 3,725,651 | 4/1973 | Cutter | 318/569 |
| 4,031,369 | 6/1977 | Heaman et al. | 318/573 X |
| 4,214,192 | 7/1980 | Bromer et al. | 318/573 |
| 4,456,863 | 6/1984 | Matusek | 318/572 |
| 4,555,758 | 11/1985 | Inabe et al. | 318/606 X |
| 4,578,748 | 3/1986 | Abe et al. | 318/626 X |
| 4,598,380 | 7/1986 | Holmes et al. | 364/513 |
| 4,600,985 | 7/1986 | Nozawa et al. | 318/571 X |
| 4,644,460 | 2/1987 | Kishi et al. | 318/568.11 X |
| 4,728,872 | 3/1988 | Kishi et al. | 318/567 X |
| 4,761,595 | 8/1988 | Goor | 318/567 X |
| 4,787,049 | 11/1988 | Hirata et al. | 318/571 X |
| 4,810,945 | 3/1989 | Yoneda et al. | 318/571 |
| 4,879,663 | 11/1989 | Fuehrer | 364/474.31 X |
| 4,912,385 | 3/1990 | Kawamura et al. | 318/571 X |
| 4,987,356 | 1/1991 | Yamada et al. | 318/571 X |
| 5,126,645 | 6/1992 | Yoshimi et al. | 318/568.11 |
| 5,144,211 | 9/1992 | Daggett et al. | 318/568.11 |
| 5,177,421 | 1/1993 | Sasaki et al. | 318/571 |
| 5,212,430 | 5/1993 | Jartyn | 318/34 |
| 5,315,222 | 5/1994 | Kasagami et al. | 318/568.11 |
| 5,331,264 | 7/1994 | Cheng et al. | 318/568.11 |

OTHER PUBLICATIONS

Thomas B. Bullock, "Motion Control and Industrial Controllers", *Motion Control*, Sep./Oct. 1990.

Thomas B. Bullock, "Linear and Circular Interpolation", *Motion Control*, Apr. 1992, pp. 40–41.

Curtis S. Wilson, "How Close Do You Have to Specify Points In a Cotouring Application?", *Motion Control*, May 1993, pp. 48–52.

*Primary Examiner*—Brian Sircus
*Attorney, Agent, or Firm*—Graybeal Jackson Haley & Johnson

[57] ABSTRACT

A system for controlling motion in machine tools and industrial robots. From the specification of a part to be cut or a path to be followed by a machine tool or a robot, the system calculates, for each axis, for each incremental step along the path, a position command, a time delay between successive position commands, and, optionally, a force command based on a prediction of predicted resistive forces. Calculations are specified for precisely controlling velocity, acceleration, and jerk. The generated data is stored in a memory device and subsequently directed to the machine tool or robot.

27 Claims, 5 Drawing Sheets

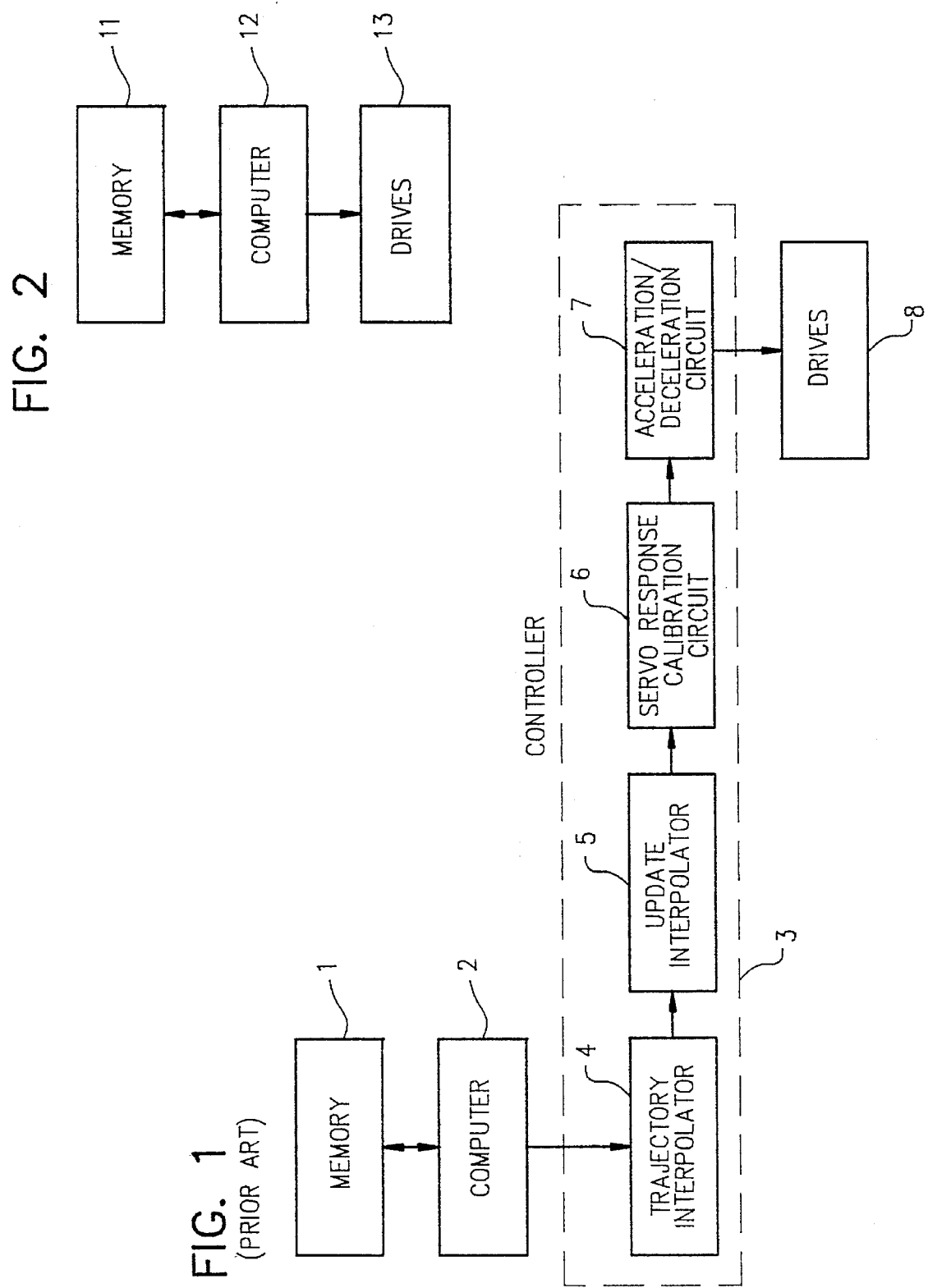

MOTION CONTROL WITH PRECOMPUTATION

This invention pertains to systems for controlling motion in machine tools and industrial robots and, for such devices, methods for controlling motion velocity, acceleration, and jerk, particularly in jet cutting tools.

BACKGROUND

As shown in FIG. 1, prior art control of numerically controlled machine tools is accomplished with a memory device 1, such as a magnetic disk drive, containing a path specification composed of straight line segments and arc segments specified by their end points, which path specification is read by a computer 2 and transferred to a controller 3 which is coupled to the machine tool drives 8. A common form of machine tool drive is shown as part of FIG. 3 by a servo 56 driving a motor 63.

The controllers for numerically controlled machine tools are specialty computers sold in relatively low volume at a high price which, in real time, translate the path specification into incremental commands for the machine tool drives. The inner workings are proprietary to the makers and it is very difficult for the buyer to accomplish anything with the controller other than the methods offered by the manufacturer. In particular it is difficult to precisely control the traverse velocity, acceleration, and jerk at every portion of a complex curve.

As CAD and computer representation of parts has become common, a group of suppliers has arisen that supplies software which reads the CAD file and writes a part program for use in the machine tool controller (CAD/CAM software). These systems are better than hand programming, but still can not provide full control of the machine tool because of the machine tool controller limits. A number of jet cutting machines have been built using these technologies.

Another group of suppliers has arisen that provides plug in cards for a personal computer (PC) that contain auxiliary microprocessor chips that do the calculations normally performed in a machine tool controller. The PC provides to the auxiliary microprocessor a data stream analogous to the machine tool program, but does not directly control the motion which is accomplished by the auxiliary microprocessor. These cards provide a more cost effective system than a machine tool controller but still suffer from limited ability to control velocity along a complex path. The systems are simply a machine tool controller packaged within a PC. In general they use CAD/CAM software as described above.

The functions performed by prior art controllers for numerically controlled machine tools are illustrated within the controller block 3 of FIG. 1 and described by the following references: U.S. Pat. No. Re. 30,132 (Irie); U.S. Pat. No. 4,214,192 (Bromer); U.S. Pat. No. 4,456,863 (Matusek); U.S. Pat. No. 4,600,985 (Nozawa); T. Bullock, "Motion Control and Industrial Controllers", *Motion Control*, September/October, 1990; T. Bullock, "Linear and Circular Interpolation", *Motion Control*, April 1992; C. Wilson, "How Close Do You Have to Specify Points in a Contouring Application?", *Motion Control*, May 1993.

The Irie reference describes how the path to be followed by the point of a tool may be described as line segments specified by beginning and ending points. These beginning and ending points are input to a controller which interpolates all of the intermediate points on a real time basis and instructs the drive motors such that the point of the tool is commanded to pass through each of the intermediate points.

The Wilson reference describes how the controllers have become much more sophisticated since Irie. As described by Wilson, it is desirable to achieve more carefully tailored control of the motion of the tool than is possible by a single circuit controller. Ideally, motion control is calculated to adjust desired velocity and acceleration in between each individual point to which the machine tool can be commanded. This is typically on the order of 2,000 points per inch. When the machine tool is travelling at many inches per second, there is very little time to make the appropriate calculations to adjust the velocity and acceleration commands as desired between each point. Consequently, Wilson describes how modern controllers contain two circuits. The first circuit 4 receives the commands from the computer as they have been previously stored, typically in the form of straight line segments and arc segments, and computes the beginning point and ending point of each segment, with interpolation of a moderate number of points in between. This first circuit is referred to in FIG. 1 as a trajectory interpolator 4. The data from this first circuit is then provided to a second circuit referred to in FIG. 1 as an update interpolator 5. Within the time allowed by each update cycle of the servomotors or stepper motors of the machine tool drives, the update interpolator 5 interpolates additional in between points to which the machine tool should be commanded and adjusts the velocity and acceleration of the machine tool to optimize performance of the tool.

Wilson describes how the update interpolator can accept desired velocity commands which were recorded in the memory device and passed on by the computer and adjust the commands to the machine tool drives to command a constant velocity within each line segment as shown in FIG. 6(A). Wilson further describes how an improved interpolator will consider acceleration limitations of the machine tool and acceleration preferences for producing desired results to adjust the commands to the drives to operate at preferred accelerations in between specified points as shown in FIG. 6(C). This avoids undesired acceleration effects due to sudden velocity changes. Wilson then further describes how sudden changes in acceleration can produce undesired jerk of the machine tool. To avoid the jerk, the most sophisticated update interpolators can further adjust the commands to the machine tool drives so that there are no sudden changes in acceleration and the graph of velocity against position of the tool is comprised only of smooth curves as shown in FIG. 6(D).

In addition to the trajectory interpolator and the update interpolator, the other references describe further improvements to the design of real time controllers. As described by Matusek, there is normally a lag between the commanded position of the tool and the actual position achieved by the tool. This lag can be empirically measured and a table of calibration adjustments can be developed. When the calibration adjustments are added to the desired position commands by a servo response calibration circuit 6, the resulting commands to the drive make up for the lag.

Another solution of the problem of lag, known as feed forward is further described in the 1990 article by T. Bullock. In addition to interpreting position commands to compute desired changes in position with a position command interpreter circuit 54 as shown in FIG. 3, a controller with feed forward computes the desired velocity with a position command differentiator circuit 53, and sends the appropriate voltage to achieve the commanded velocity to the servo input 57.
}

Another improvement to the circuits of prior art controllers is described in the Nozawa reference. Because of the previously described lag between the commanded position and the actual position, when a machine tool is commanded to execute a sharp corner, it will round the corner. Nozawa describes a solution to the problem of rounding whereby the commands to begin moving in the direction following the corner are delayed while the commands to continue movement in the direction preceding the corner are continued until the machine tool approaches an acceptable tolerance for rounding. Nozawa refers to these circuits as acceleration/ deceleration circuits 7.

With the addition of the above-described circuits, which operate in real time to make appropriate adjustments to the commands passed through to the drive motors, sophisticated controllers have become quite complex. Furthermore, the information which must be supplied to the controllers in order to generate the desired motion, including limitation of errors and preferred velocity control, have also become complex. However, because the controllers must perform complex calculations to generate the interpolated points within each specified line segment and other functions, if the line segments supplied to the controller are too short, or if too much additional data is supplied to the controller, the controller cannot keep up with the required calculations, limiting the benefits that can be realized from the present complexity.

Also, the most sophisticated controllers do not consider predictions of resisting forces that the motors will experience.

SUMMARY OF THE INVENTION

As shown in FIG. 2, the present invention controls a machine tool directly from a computer without add in cards and without an intermediate command interpreting controller. It is particularly useful when accurate velocity control is required as for jet cutting processes, but also has other applications. In this system, all computation is done before data is sent to the machine tool, resulting in a huge (multiple megabytes) number of incremental instructions which are stored in memory and are sent to the machine tool sometime later when the part is to be cut. With this system, the file size is related to the path length, but computation time is not related to the motion speed and there are no time limits on complex computations, allowing computations which fully account for the interaction between the tool and the material and optimize machine limitations such as maximum velocity, maximum acceleration, and problems of jerk when changing rates of acceleration.

Moreover, there is no computing hardware required beyond the PC so that the solution is very cost effective. A 486 PC for $2000 has far more computing power than a machine tool controller costing 5 to 10 times as much. With the system disclosed herein, it is no more difficult to cut a part than to plot or print a drawing, while having complete control over the velocity at every point along the path.

With this invention, the sophisticated circuits of prior art controllers are replaced by calculations performed by the computer not in real time; that is, all of the calculations that might be done by a controller are performed before any information is sent to the machine tool drives. With appropriate programming of the computer, all of the calculations of sophisticated controllers can be duplicated and can be improved upon without adding hardware. Because the calculations are not performed real time, separate circuits are not required for trajectory interpolation and for update interpolation. The calibration table of Matusek can be incorporated. The acceleration/deceleration circuit of Nozawa used to minimize rounding of corners can be incorporated. Careful adjustment of velocity to eliminate any abrupt changes in acceleration, as described in the Wilson reference, can be incorporated. The preferred embodiment allows all of these calculations to be made and adjusted for each smallest possible step that the machine tool can make, no matter how small.

To accomplish these features, the invented system creates a large data file composed of alternating bytes (16 bits per byte in the preferred embodiment) of information. Every other byte in the file is a step byte which contains a +1, a zero, or a −1 for each of the axes in the machine tool. In between each of these step bytes is a time delay byte which specifies the time delay to wait between sending the preceding step command and the succeeding step command. The time delay byte is expressed in cycles of a timer chip in the computer to wait between sending step commands. Two successive step commands are sent to the machine tool drives at the speed selected for the timer chip multiplied by the number of timer ticks specified in the time delay byte.

In another aspect of the invention, the step command byte includes information to turn on or turn off, or to increase or decrease, the rate of action of the tool head, such as changing pressure in a jet or speed of rotation of a rotating cutter head. In another aspect, the invention allows variations in feed rate velocity within a single line segment specified by the input drawing. The invention also allows a detailed specification of machine tool acceleration, including avoidance of jerk, and feed rate lag compensation (feed forward).

In another aspect, the invention allows a desired finished surface quality to be specified for each line segment of the input drawing, which surface quality value is used by calculation algorithms to adjust velocity, acceleration, and jerk, so as to minimize cutting time without falling below the minimal quality.

A preferred embodiment of the invention is a complete system to go from a two dimensional CAD representation of a part to a finished part using jet cutting tools with appropriate consideration of the dynamics of how the jet affects the cutting process. Such tools include water and abrasive jets, oxyacetylene torches, plasma torches, and laser cutters. The common characteristic of these tools is that the distance between the entry point of the jet and the exit point of the jet is a function of the rate at which the jet traverses the material. Also, the surface finish on the cut surface deteriorates at high cutting speed because a side to side motion is induced in the jet as it cuts, and, for some jet cutting tools, moving too slowly will cause the kerf to become too wide or leave marks on the part. Consequently, total control of the velocity along the cutting path is required for accurate cutting using jet cutting tools.

In another aspect, the invention is a method for calculating the maximum speed allowable while cutting curves with jet cutting tools without exceeding maximum taper allowances. Also, the invention allows calculating of maximum acceleration straight ahead speed and corner speed based on desired surface finish quality.

An optional feature includes a further aspect. The computer uses inputs of predicted motor inertia, tool inertia, and tool resistance to calculate the amount of current that should be supplied to the motor at each point. It then outputs force commands 68 to a force command interpreting circuit 52 which supplies to the motor sufficient current to meet the predicted resisting force, thereby reducing the lag.

BRIEF DESCRIPTION OF THE DRAWINGS

FIG. 1 shows prior art control systems including components of prior art controllers.

FIG. 2 shows the hardware components of the invention.

DETAILED DESCRIPTION

Hardware

FIG. 2 shows the required hardware components of the invention: a memory 11, which is preferably a hard disk drive with a tape backup, coupled to a computer 12, which preferably is a microcomputer contained in the same housing as the hard disk drive, coupled to the drives of the numerically controlled machine tool 13, which are preferably coupled to one or more eight channel parallel output ports on the computer.

Figure 3:
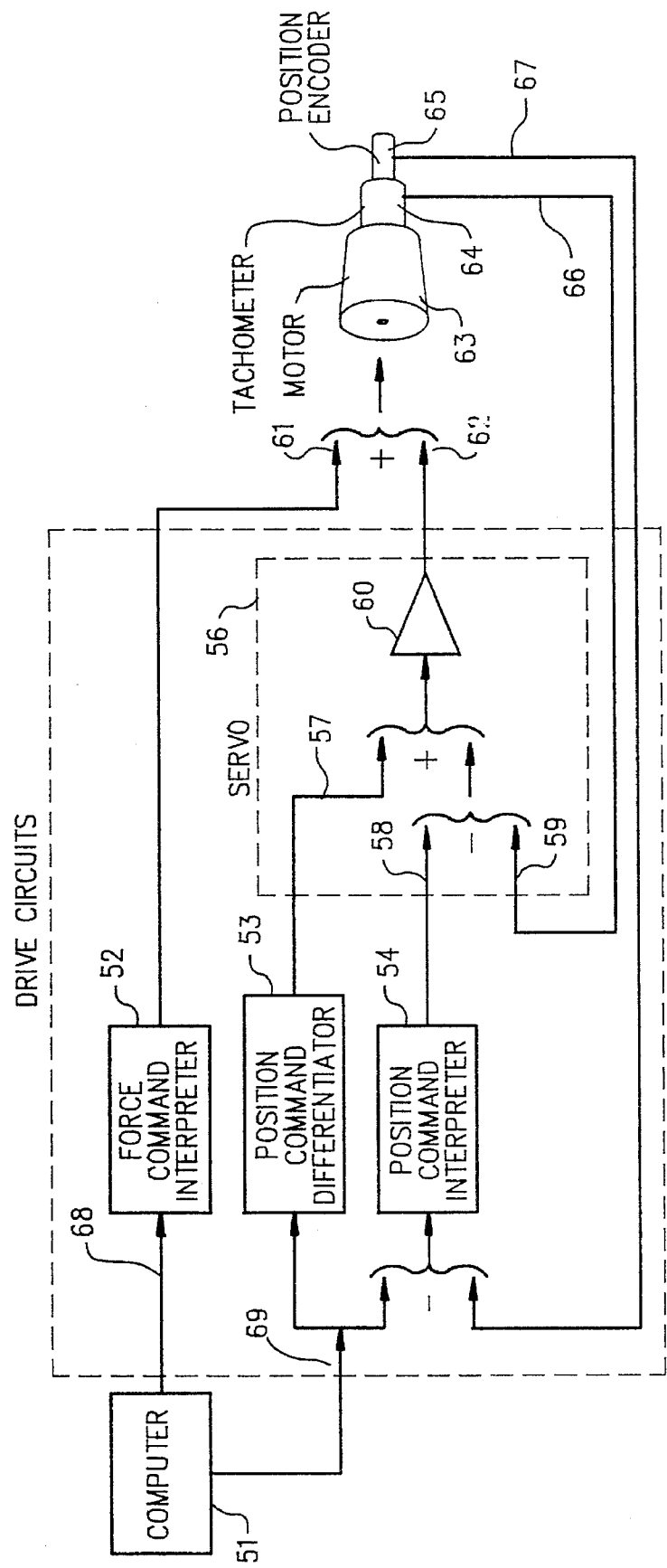
FIG. 3 shows the components of the drive circuits used in the invention.

The drive circuits of the preferred embodiment are further detailed in FIG. 3. Although a stepper motor may be used with no feedback loops, the preferred embodiment uses a tachometer 64 with a velocity feedback loop 66 to a velocity servo 56 and a position feedback loop 67 from a position encoder 65 to a position command interpreter 54.

Many applications, including jet cutting, do not require the force command interpreter 52 or its input line 68 or output line 61. These elements are further described in a subsequent section.

The preferred embodiment includes a position command differentiator circuit 53 to generate a velocity feed forward signal 57. An alternate embodiment of the invention would allow the position command interpreter circuit to be eliminated. Velocity commands could be calculated by the computer as the time differential of position commands and they could be sent by another signal line to a velocity command interpreter for generating the feed forward signal. However, a position command differentiator circuit is simple and no more expensive than a velocity command interpreter circuit, and desired velocity can be computed without error from a stream of position commands over time. The preferred embodiment requires one less data line and less computation by the computer than this alternative embodiment.

Procedures for Use

The process of using the system to determine the cutter path and speed for a two dimensional part is summarized in Table 1 below. The same methods apply to creation of three dimensional parts.

TABLE 1

Steps for Operating Precomputation Motion Control System

-1-
Load CAD Drawing

-2-
Add Cutter Lead Ins
and Lead Outs

-3-
Select Surface
Finishes

-4-
Order Segments
into Cutter Path

-5-
Define Material
Thickness and
Cutter Characteristics

-6-
Offset Path for
Cutter Width

-7-
Generate Step Commands
for Each Axis

-8-
Set Timing between
Step Commands

-9-
Simulate Cut or
Feed Step Commands to
Drives to Make Part

Table 1 shows the overall procedures to go from a CAD representation of a part to the part itself. If a part has only a paper drawing representation, a preliminary step is to draw it with a CAD system, an easier process than writing a cutter control program by hand.

Step 1 is self explanatory and can come from a number of very good CAD systems or vector based drawing programs on the market. The data is input into the system with a standard drawing interchange format, for example as a DXF file. If a bit mapped drawing is used, it must be first converted to a vector based drawing with one of the automatic tracing programs available.

In step 2, the path to be followed by the cutter as it enters and leaves the work is defined by drawing it with a CAD editor. This can be done with the same CAD editor that was used to create the drawing or with any other CAD editor that can edit the interchange format. Standard lead in lead out paths can be quickly inserted or the user can define his own special paths. This data must be provided for the outer contour of the part and for each hole within the part. Then, the non-cutting paths between the holes or parts must be drawn.

In step 3, the user selects the precision and surface finish required at each portion of the path. The non-cutting portions of the path are specified as such at this step. High precision cuts are slower than rough cuts and the economics of the part production are determined by the choices at this step.

Until this point, the segments of the path are stored more or less in the order in which they were drawn. CAD and draw programs do not embrace the notion of a continuous path. In step 4 the beginning of the path is identified and the program connects the segments into a continuous path. If it reaches a fork in the path it zooms in to give a good view on the computer screen and asks the user which leg of the fork to follow. When the program reaches the end of a segment that traverses without cutting, the user can choose on which side of the path to locate the cut in the new cutting region.

Steps 1 through 4 have fully specified the part to be made and the cutter path to be followed in making the part. It can be saved in this form as required for future use. From step 5 onward the characteristics of the material and particular machine tool being used must be known. These values may change from time to time because of wear of the cutting nozzle or other reasons. Therefore, steps 5 through 9 are repeated frequently as required.

In step 5 the user selects the material being cut from a table that lists the cutting index or he estimates the cutting index by interpolating between existing values. Alternatively, the user may execute an automated test cutting procedure that determines the cutting index for a material. Next, the material thickness is specified. These values are used by the program to determine the speeds required to achieve the precision and surface finish specified earlier. Then the user specifies the setup of the machine in terms of nozzle sizes etc. If the part has already been cut or set up for cutting, the user simply verifies that the existing setup is still valid. At this point he can adjust the tool offset that compensates for the width of the kerf cut by the tool.

Steps 6, 7 and 8 are then performed automatically without user intervention. After these steps, a set of step and direction commands and associated time delay instructions reside in memory ready to be sent to the servo systems to perform the necessary cutting. The software that performs steps 6, 7, and 8 is described in detail in subsequent paragraphs.

In step 9 the user can check the work to date by simulating the cut on the screen or he can start the cutting process and make the part.

Motion Control System

Motion control is achieved by providing a timed set of step and direction commands for each motor. It is well suited for controlling stepping motors, but improved system performance can be achieved by using servo motors driven by a position controller that accepts step and direction input. Various position controller manufacturers refer to step and direction input as "electronic gearing" or "handwheel mode" or "pulse input". The position as a function of time and all its derivatives are completely specified by the pulse train for each motor. The pulse train specifies what each motor is to do and the position control system is responsible for insuring that the motor does it. It is the responsibility of the pulse train writer to insure that no impossible requirements such as unachievable acceleration are placed on the motor.

The method described here is only useful for what might be called predestined motion where everything about the motion is known ahead of time. It is not useful for adaptive control where the motion system must adapt to changing conditions such as in using a vision system to pick up moving parts. Within the constraint of predestined motion it is generally useful and can handle motion in as many axes as desired. However, for purposes of illustration of the method it is easiest to consider only two dimensional motion in the x-y plane.

Consider a curve in the x-y plane. This curve can be described in the form of a table of absolute x and y values. An example is the table below which shows the x-y values for a 45 degree line running from 0,0 to 1,1 in steps of 0.1. The time at which each x-y point is reached is also shown indicating that the motion is at uniform velocity taking 1 sec to go from 0,0 to 1,1. The same curve can be described as a series of incremental values dx and dy which are added cumulatively from a starting point (0,0) to get the absolute values of position. These steps dx and dy can be regarded as step commands to be sent to a stepping or servo motor where the + indicates a step in the positive direction. Also, the time can be expressed as the time dt to wait before sending the step command dx, dy to move to the next point, as shown in Table 2 below.

TABLE 2 x-y Time Values for a Line

| x | y | time | dx | dy | dt |
|---|---|------|----|----|----|
| 0 | 0 | 0 | +.1 | +.1 | .1 |
| .1 | .1 | .1 | +.1 | +.1 | .1 |
| .2 | .2 | .2 | +.1 | +.1 | .1 |
| .3 | .3 | .3 | +.1 | +.1 | .1 |
| .4 | .4 | .4 | +.1 | +.1 | .1 |
| .5 | .5 | .5 | +.1 | +.1 | .1 |
| .6 | .6 | .6 | +.1 | +.1 | .1 |
| .7 | .7 | .7 | +.1 | +.1 | .1 |
| .8 | .8 | .8 | +.1 | +.1 | .1 |
| .9 | .9 | .9 | +.1 | | |
| 1.0 | 1.0 | 1.0 | | | |

Each increment of specified motion commands the point of the tool to move along one of the axes, if the command for that axis is 0, or diagonal to the axes, and nothing in between. A single unit of movement on each axis, which, if the axes are orthogonal and the units of movement are equal on each axis, specifies motion at a 45 degree angle to the axes.

A curve can be specified to any required degree of accuracy by making the interval between points as small as required. For example 0.0001" is small enough for jet cutting and most machining purposes, but even this is not a limit. The limit is determined by the smallest increment in which the machine tool can be commanded, which, with this invention, is likely to become smaller as higher degrees of precision are desired. The higher the accuracy, the longer the table becomes, but this is of no practical consequence because memory is very low cost.

The advantage of a long table is two fold. First, the points can be calculated before any motion begins and elaborate calculations with multiple or even non-orthogonal axes can be done. Second, the time at which the step command is sent is totally free and an elaborate calculation about when to send each step can be done. Note that the time increments do not in any way affect the shape of the curve. They only affect the velocity with which the point of the tool is commanded to move along the curve, the accelerations, and jerk. Velocities, accelerations, and jerk can be controlled by appropriate choice of the time increments dt. Additional axes of z, theta, phi, etc. may be included in the table with little additional difficulty.

A table such as table 2 is generated in two steps. First, a table of distance values for the geometric axes is generated, filling in the times with increments corresponding to the maximum desired speeds at each point as dictated by the desired quality parameter specified by the user for that segment. It is convenient to space the x and y entries in the table so that they represent equal distance steps along the path being followed, but other spacings could be used as well. With the algorithm employed in the preferred embodiment, the distance of each step must be smaller than or equal to the one pulse distance of the tool drives. This procedure is listed as step 7 in Table 1. Second, some of the times are adjusted upward corresponding to slower speeds as necessary to meet maximum acceleration limits and smooth changes in acceleration to avoid jerk. This is listed as step 8 in Table 1. Both steps 7 and 8 are explained in detail below.

The step command is, of course, not exactly as listed in Table 2 because the system does not command a step of 0.1. It is either 1 or 0 with a sign of either + or −. Consequently, the command for each axis takes only 2 bits. Signals for 4 axes, or for 3 axes plus two bit tool head control, can be sent out the 8 bit parallel port of a PC. The time between steps is also represented as an integer specifying the number of timer ticks to wait before sending the next bit pattern.

The exact format in which the data are stored is shown in Table 3 below:

TABLE 3

TIME AND POSITION TWO BYTE STRUCTURE (16 BITS IN EACH BYTE)
aAbB oOoO OOpP yYxX    TTTT TTTT TTTT TTTT    where:
  X = X AXIS COMMAND, x= 0 IS + DIRECTION
  Y = Y AXIS COMMAND, y= 0 IS + DIRECTION
  P = PRESSURE COMMAND. IN PRECEDING 2 BITS,
    00 MEANS PUMP OFF, 11 MEANS PUMP ON,
    OTHERWISE pP RAMPS PRESSURE UP, DOWN, OR SAME
  T = 16 BIT INTEGER GIVING TIMER TICKS TO WAIT
  aA = RAMP X AXIS CURRENT UP, DOWN, OR SAME (or
    additional axis use)
  bB = RAMP Y AXIS CURRENT UP, DOWN, OR SAME (or
    additional axis use)
  oOoO = RESERVED FOR ADDITIONAL AXES OR OTHER USE If the current command bits are used for step and direction rather than minimizing lag by sending the predicted current requirement (explained below), the data structure provides for expansion to 8 axes (tool head control may be considered an axis) and can handle a time (speed) variation of a factor of $2^{16}$. In standard 8-bit bytes, each step requires 4 bytes of data. Thus a 100 inch long path with a resolution of 0.0001 inch requires 4 megabytes of storage. The data structure and method do not require orthogonal axes, and the method is very useful for controlling robots in multidimensional motion.

Until this point, only maximum velocity constraints have been placed on the motion. We must now adjust the time increments to insure that we are not exceeding other constraints on the motion.

Constraints on Motion

Constraints are placed on the motion by two classes of phenomena. First, the motion can not require velocities or accelerations larger than the motors are capable of providing and the accelerations must not change rapidly to avoid vibrations in the apparatus (jerk). These might be called Newtonian constraints because they are related to Newton's laws of motion. All motion systems are subject to these constraints. As described by T. Bullock and Matusek, this control system can provide look ahead (feed forward or servo response calibration) capability to maximize the performance of a given set of motors while remaining within the Newtonian constraints. Likewise, the acceleration/deceleration control described by Nozawa can be incorporated. The computer is programmed to calculate, according to known formulas, for each increment of motion, the velocity, acceleration, and jerk, and adjust the time delay values to meet these constraints.

The second class of constraints relates to the use of the motion. The most simple example is a maximum desired velocity dictated by tool/workpiece interaction. Another constraint is maintaining a constant velocity as a contour is traversed, a desired feature for jet cutting processes. The control scheme outlined above can handle far more complex requirements, such as those desired in jet cutting. Algorithms for determining additional constraints for jet cutting and making the required adjustments to the time delay values are described in a subsequent section below.

Representation of the Curved Path and the Offset Algorithm

As originally specified, the path is represented by a series of lines and arcs. This is the format of a DXF file and the format usually used for machine tool control. In principle, all shapes can be represented with lines only and that is done by some of the less sophisticated DXF translating software. Getting sufficient accuracy then results in files containing thousands of short lines. These files are no problem for this system but often exceed the input speed limitations of many machine tool controllers if translated directly to input codes. The preferred embodiment uses both lines and arcs to be able to accept any DXF file and because the smaller amount of data permits faster manipulation for the offset calculation (step 6 of Table 1). The calculation for steps 7 and 8 depends on the path length and not its complexity.

The ordered path is represented as a series of arc or line segments where each segment is defined relative to its following segment with the following format:

X Y B Q where
  X,Y is the start point of the segment (the end point is the start of the next segment)
  B is tangent of ¼ the included angle of the segment (to specify the curvature)
  Q is the cut quality specified for the line Of course, B and Q are meaningless for the last data line in the file.

If B is positive, the rotation from X,Y to the start of the next line is counterclockwise. If B is zero, the segment is a straight line and if B is 1 it is a semicircular arc. When B is infinite, the arc is a complete circle. To simplify the mathematics, any arc with a B greater than 1 is replaced with two arcs half as long each.

In the quality parameter, Q=0 means no cutting. The sign of Q is used to indicate whether the cutter should traverse to the left of the line (negative Q) or to the right of the line (positive Q). In the preferred embodiment, Q can have only a range from −5 to +5. The magnitude of Q is used to calculate speed limitations and cutter head control limitations to achieve the desired quality with particular materials and cutter heads.

Q is further coded to provide additional functions. If it is desired to cut right on top of the line with no offset then 100 (with the same sign as Q) is added to Q. If it is desired to stop to wait for user input after a segment is traversed, then 1000 (with the same sign as Q) is added to Q. Other functions can also be added by this means.

In step 6 of Table 1, the segments are offset by an amount equal to half the kerf width in the direction determined by the sign of Q. Lines move parallel to themselves and arcs keep the same center and change radius. If 2 segments meet in a convex corner, an arc segment is added to join the two segments. Otherwise, the segments are truncated at their new intersection point. Lines with zero offset (no cutting) are moved and stretched to meet the offset ends of the segments that they join. A transition from left offset to right offset can be made only through an intermediate non-cutting segment.

Step Setting Algorithm

Figure 4:
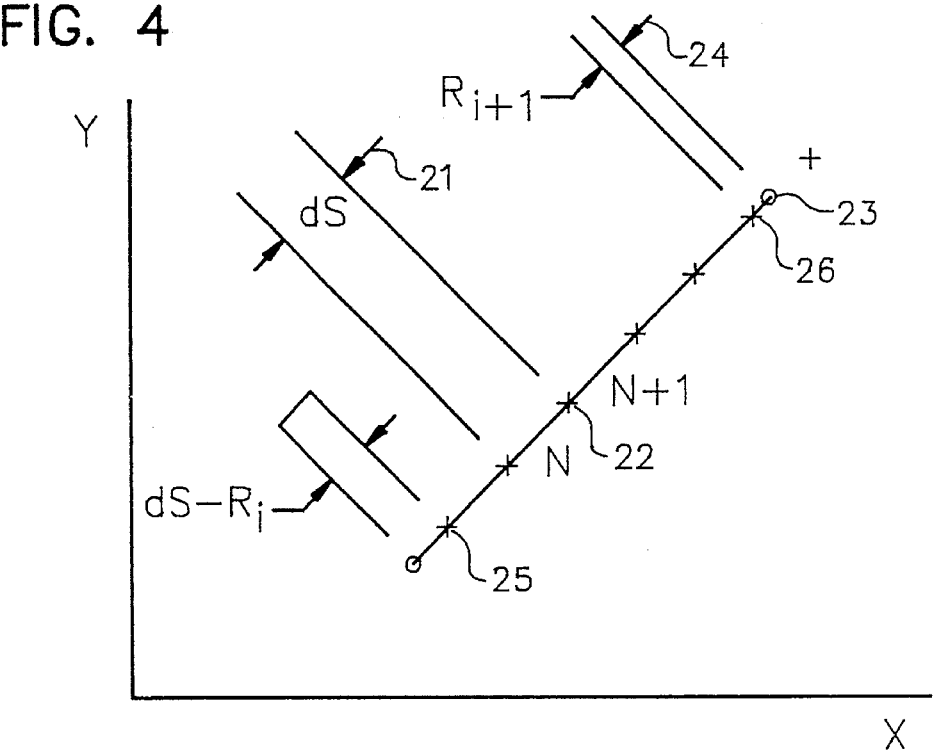
FIG. 4 shows the method of converting an input straight line segment to incremental commanded points.
Figure 5:
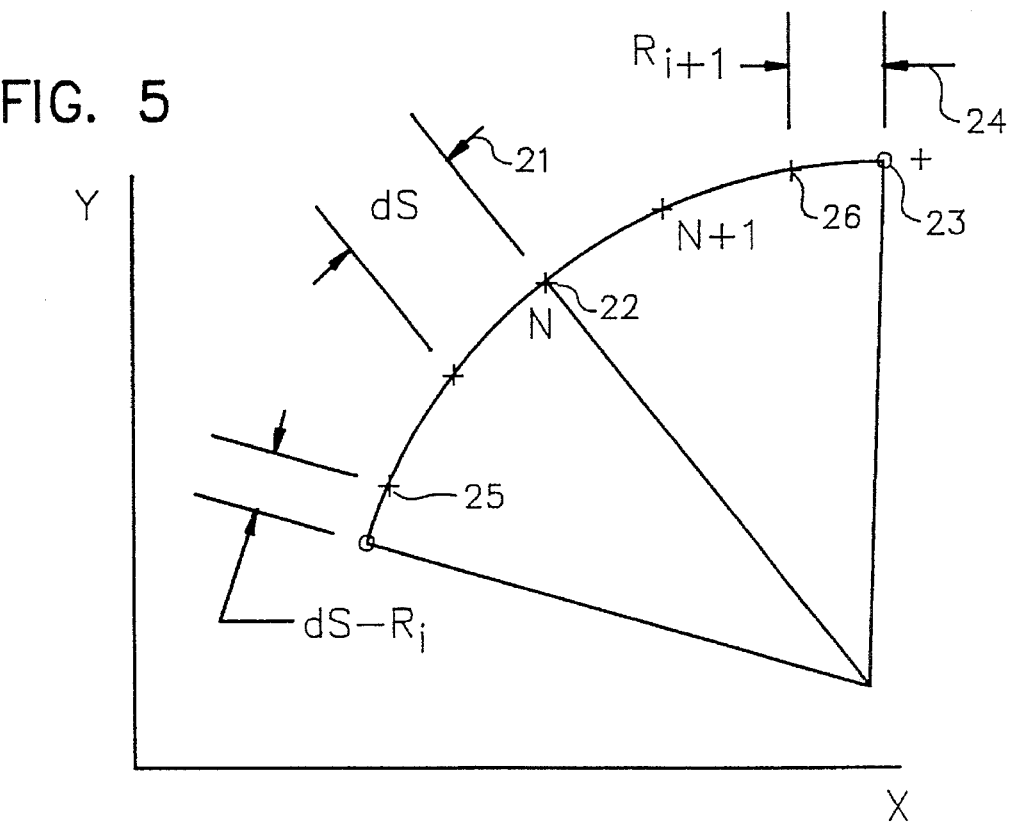
FIG. 5 shows the method of converting an input arc segment to incremental commanded points.

The curve definition table (see Tables 2 and 3) is calculated from the offset file by one of two methods depending upon whether the segment of the path is a straight line or an arc. In both cases, the steps are chosen so that each step represents a constant distance along the path. In the preferred embodiment, the step size is equal to the smallest step command usable by an axis. The two cases are illustrated in FIGS. 4 and 5. In both cases, a step, dS 21 is taken and the new x,y coordinates of point N 22 are calculated by known geometric methods and rounded to the axis step resolution. If the new coordinate value, expressed in the axis step resolution, is greater than the old, a +1 is written to the data table. If less, a −1 is written, and if the same, a 0 is written. This process continues until the whole path has been traversed.

As the path is traversed, the maximum speed is determined for each entity being traversed. The maximum speed is taken as the lesser of the Newtonian or cutting process limit. The time increment for the step size divided by this speed is written to the data file. At this stage, no attention is paid to acceleration or jerk.

When the end point of an entity 23 is passed, the amount by which it is passed, expressed as the distance R 24 from the last point N 26 to the end point 23, is used to place the first point 25 on the next entity, and the new reference point is taken as that end point. This procedure keeps the step sizes identical and ensures that errors do not accumulate as the path is traversed. Also, the angle by which the path bends at this end point is calculated and a maximum speed for traversing the corner with the particular tool and material is determined. The maximum speed may be determined as described in Nozawa, considering the time required for the lag in tool position to catch up with the commanded position. In the preferred embodiment for jet cutting tools, the maximum speed for traversing the corner is calculated as specified in a subsequent section. The corresponding time delay is written to the file for this one point.

As mentioned previously, the step size dS 21 need not be the same everywhere except that it saves calculation time by reducing calculation complexity when the time is calculated in the time setting algorithm described next. When a file of multiple megabytes is processed, this saves a substantial amount of time.

Time Setting Algorithm

Figure 6A:
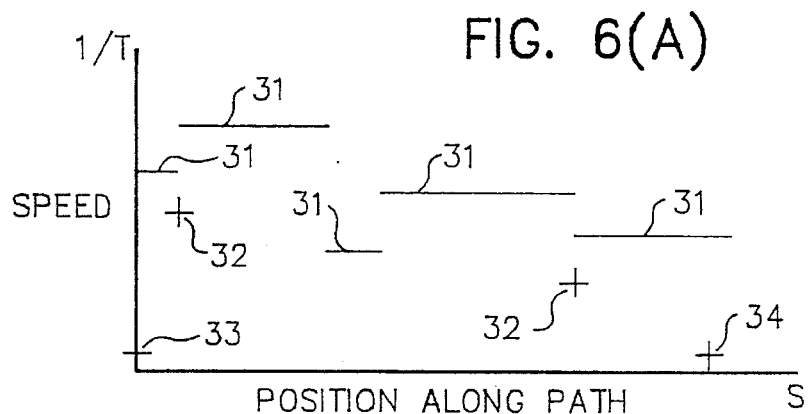
FIG. 6(A) shows the initial graph of speed against position prior to adjustment for acceleration and jerk.

The data written to the file at this point is illustrated in FIG. 6(A). Here we see the reciprocal of the time delay, 1/T, which is proportional to the velocity at constant step size, plotted against the position along the path. Slow speeds are at the bottom of the plot and high speeds at the top. Horizontal lines 31 show regions of constant velocity along a segment and small crosses 32 show point velocity values at segment joining points. At the two end points 33 and 34, the time delay has been set to its maximum value (1/T is a minimum) because the motion begins and ends at these points.

First, because the increment dS used to calculate the data is no larger than the step size of the drives, some of the data points will specify movement of zero in all axes. To reduce the size of the file to be stored in memory, each such point can be eliminated and its time delay value is added to the adjacent point.

Figure 6B:
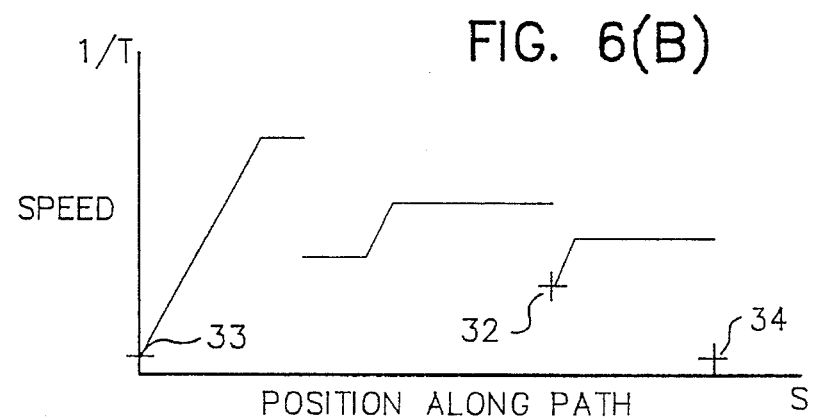
FIG. 6(B) shows a graph of speed against position after adjustment from left to right for acceleration limitations.

Now, the task of the algorithm is to increase the time delay sizes of the higher points on the plot to bring them down only so far as necessary (maintaining as high a velocity as possible) to meet any acceleration limits. This is accomplished by making two sweeps through the table, one from each end, and resetting the time delays choosing the greater of the acceleration limit or the existing velocity limit. FIG. 6(B) shows the condition after a single sweep from left to right and FIG. 6(C) shows the condition after the reverse sweep.

The above process is sufficient for most applications where the mass of the tool is small and jerk is not an important concern. In FIG. 6(C), a straight line with finite slope represents a line of constant spatial acceleration (dv/ds) along the curve. Sharp points where two lines meet are points of infinite jerk (rate of acceleration change). In applications where it is important to limit jerk, the sharp points of FIG. 6(C) must be rounded with tangential arcs, while not increasing the velocity at any point, as shown in FIG. 6(D). This can be accomplished by numerous methods.

The preferred method of limiting jerk adds an additional step between FIG. 6(A) and FIG. 6(B). The system first sweeps through the data shown in FIG. 6(A) to identify points which represent lower velocities than the points on each side. Each such point is either an isolated point of low velocity 32, 33, or 34, or one end of a line of constant velocity 31 with a higher adjoining velocity. As they are found, each such point and the adjoining points are replaced by an arc, if the arc represents a lower velocity, with a radius chosen as the jerk limit, centered above the point and tangent to the point. This replaces isolated points of low velocity with upward facing semi-circles and extends the ends of lines of relatively low velocity with quarter-circles.

Figure 6C:
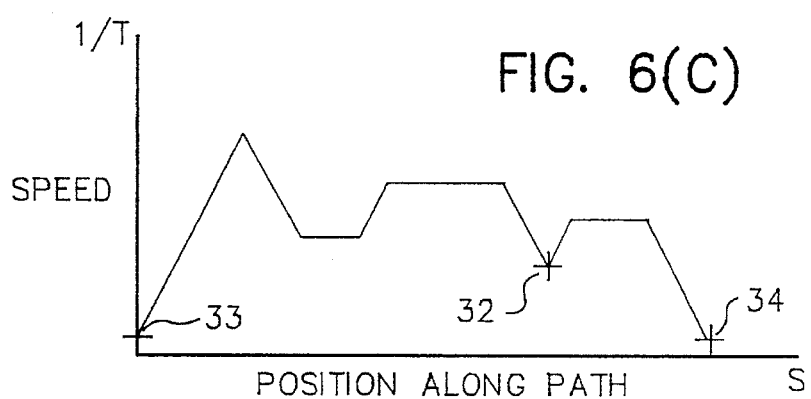
FIG. 6(C) shows a graph of speed against position after adjustment from right to left for acceleration limitations.
Figure 6D:
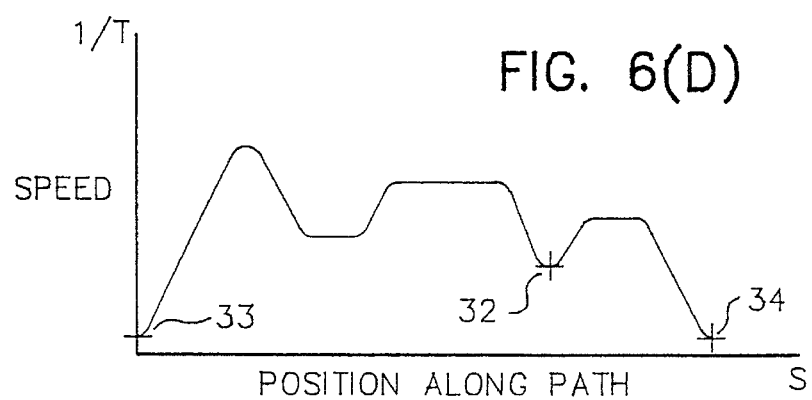
FIG. 6 (D) shows a graph of speed against position after a further adjustment for limitations in rate of acceleration change (jerk).

Then, the steps shown by FIGS. 6(B) and 6(C) are performed as previously described, producing data with upward facing sharp points but no downward facing sharp points. Finally, to identify the remaining sharp points, the data is swept to identify points of very high downward acceleration change. As each is found, it is replaced with an arc tangent to the lines on each side of the point (filleting). The resulting velocity profile appears as shown in FIG. 6(D).

Addition of Force Commands

When the inertial force of the tool or robot arm to be moved and the resistance of the material being cut or other medium through which the tool or arm must be moved are low compared to the torques of the motors used to drive them, the force command interpreter 52 and its connecting lines shown in FIG. 3 are not required. As described above, the invention allows, without time limitations, a calculation of any factor that should be considered to determine the preferred inputs to the machine tool drives. In the prior art, the only inputs have been segments of lines or arcs along with indications of preferred velocity for the segment. The resisting force that the drive motors are likely to experience has not been considered. However, these forces are often predictable. In this invention, the predictable forces are anticipated and the current directed to the motor is increased according to the prediction, reducing lag that would be induced by the greater resistance. Examples of such predictable resistance include resistance to acceleration from the inertia of the motor and other moving parts, resistance of a fluid through which the parts must move such as air, and predictable loads on a cutter head from changes in the material such as thickness, density, or direction of cutting relative to grain.

As shown in FIG. 3, the position command differentiator 53, the position command interpreter 54, and the servo 56 are well known in the prior art. When the motor 63 experiences a load, the tachometer 64 reports to the servo that the motor is slowing down. The servo calculates the difference between the input signal from the tachometer 59 and the commanded velocity input 58 from the position command interpreter 54 to determine that the velocity is not what it should be, increasing the current flowing to the motor 63. However, if the motor experiences a load, the servo will not increase the current to the motor except as a function of the difference between the velocity commanded by the position command interpreter 54 and the velocity measured by the tachometer 64, inherently producing a lag. Similarly, the velocity command 58 comes from the error between the commanded position and the actual position. In the most basic servo system this error is necessary to give a velocity command. To reduce the position error needed to give a velocity command, prior art drive circuits include feed forward circuits comprised of a position command differentiator 53 which outputs a velocity command signal 57 to the servo 56 whether or not an error exists. The position encoder 65 and feedback loop 67 are used to fine tune the velocity signal 58 and adjust it up or down as required.

The force command interpreter works in an analogous manner. As the movement of the machine tool or robot arm is planned, the expected resistance forces are calculated from parameters input to the computer system. Then, when the operation is run, in addition to outputting position commands on line 69 the computer also outputs force commands on line 68. The force commands are interpreted by the force command interpreter 52 which is connected to a powerful current source (not shown) and outputs an appropriate current to the motor at 61. The current supplied to the motor by this circuit varies based on the predicted resistance that the motor will experience. The conventional velocity feedback loop 66 and position feedback loop 67 are used to fine tune the primary source of current from the force command interpreter To use a system with the optional force command interpreter requires additional procedures and steps 5 and 8 of table 1 above. In step 5, the user also enters into the system known parameters contributing to resistance to be experienced by the motor, including those resulting from the tool-material interaction and those resulting from the machine inertia.

These parameters are used as an additional process in step 8. After the ideal velocities have been fully calculated for each point, as depicted in FIG. 6(D), an additional pass is made through the data using the velocities and accelerations commanded for each drive motor to calculate the predicted resisting force that the drive motor will experience. This resisting force is then entered as a force command for the appropriate axis by step commands exactly analogous to the position commands. A positive step increases the current to the motor and a negative step decreases it through the two bits used for current commands to each axis as shown in table 3 above. The force command represents the resisting force that the motor is predicted to experience from the time that the position command is sent until the next position command is sent.

The force command interpreter 52 produces a constant current to the motor, as dictated by the last command received, until it receives another command.

Jet Cutting Requirements

Figure 7:
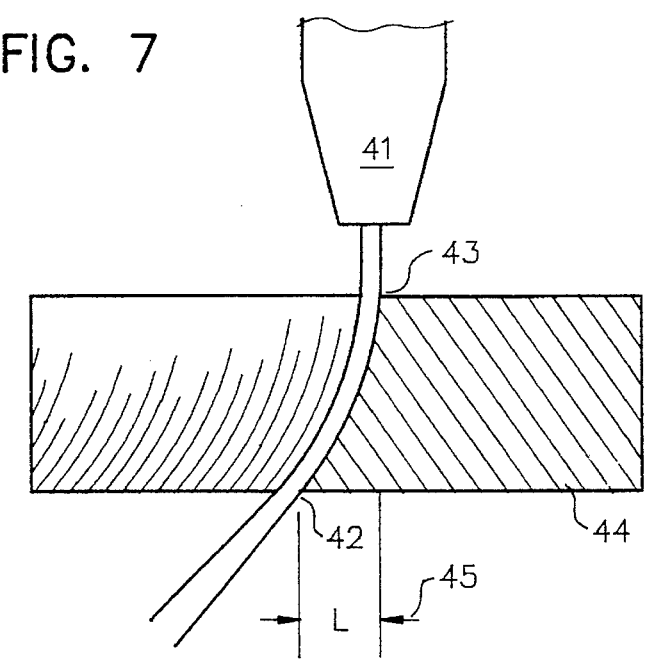
FIG. 7 shows in cross section the lag of a jet cutting a workpiece.
Figure 8:
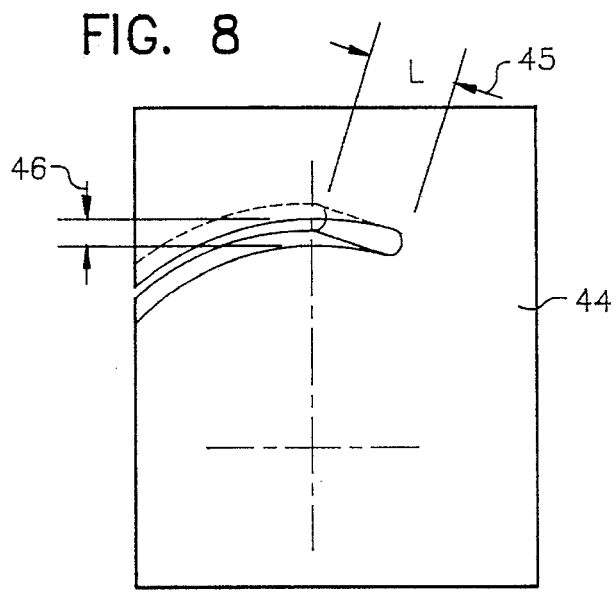
FIG. 8 shows in plan view the lag of a jet cutting a curve in a workpiece.
Figure 9:
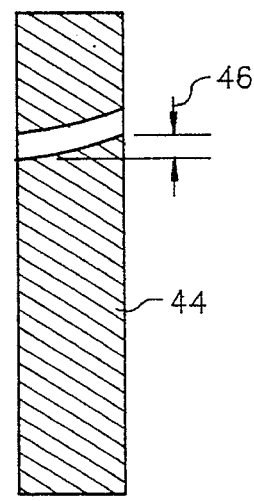
FIG. 9 shows, in cross section, the taper produced by the cut of FIG. 8.
Figure 10:
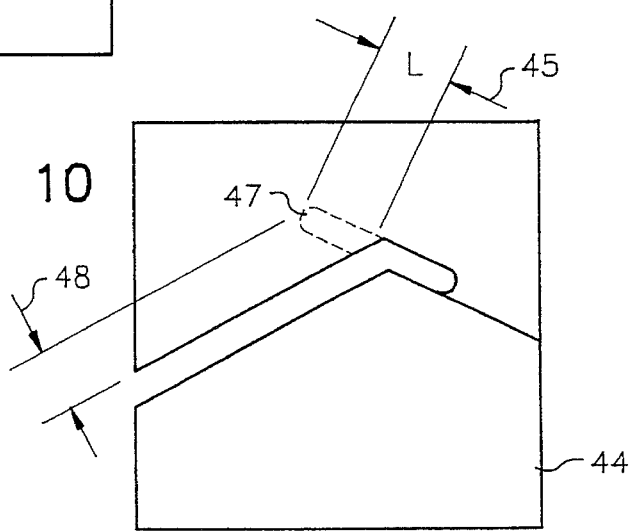
FIG. 10 shows a trough produced in the material on one side of a cut by the deflection of the jet traversing a sharp corner.

Referring to FIG. 7, in jet cutting, as the jet 41 traverses through the part 44, the exit point 42 lags the entrance point 43 by an amount of lag 45. In straight line cutting this causes little problem and the lag can be considerable with no ill effect. However, when the jet is traversing an arc, as shown in FIG. 8, the lag 45 causes a taper 46 in the part as shown in FIG. 9. Also, if the jet is rapidly accelerated around a sharp corner, it may leave an uncut region and it may deflect so as to create a trough 47 in the underside of a part on the outside of the corner as shown in FIG. 10.

In straight line cutting, the lag is dependent on the speed, and a high lag causes the jet to flop from side to side resulting in a poor finish. This sets a maximum speed for the cut given a finish requirement. However, a rapid acceleration, even within the speed limit, will cause a mark to be made on the surface. This places a constraint on the rate of change of velocity with position along the cut. Within these constraints, one wishes to move as quickly as possible to minimize the cutting time and to avoid excessive kerf caused by stopping or moving very slowly. These multiple constraints can be handled with the new system described herein.

Maximum Cutting Speed

The cutting index for a variety of materials can be used with the jet parameters to calculate the maximum speed at which the jet just barely cuts through the material. The resulting surface finish is assigned a quality of 1. The top half of a material that has just barely been cut through has a much better surface finish than the bottom half. If the speed is reduced so that the jet could just cut through a piece twice as thick, the surface finish is much better. This finish is assigned a quality of 2. Moving slowly enough to cut more than 5 times the material thickness does not significantly improve the finish. Therefore, quality 5 is regarded as the best finish possible.

By this convention a finish less than 1 means cutting partially through the part. For example, 0.1 is used to engrave a line on the part for decorative or other purposes. A finish of 0 means no cutting, and this is used to denote the jet off condition for moves without cutting.

The maximum speed U to move while producing a cut with quality Q is given by:

$$U = (KNM/QH)^{1.15} \tag{1}$$

where

U=traverse speed

H=material thickness

KNM=constant dependent on abrasive jet strength and material cutting index

Considering the shape of the lag curve and the observation that cutting through the material ceases at an exit angle of about 20 degrees, an expression for the lag as a function of cutting speed calculated with equation (1) above can be stated as:

$$L = 0.182*(H^2*U^{0.87})/KNM \tag{2}$$

where

L=lag distance

H=material thickness

U=traverse speed

KNM=constant dependent on abrasive jet strength and material cutting index

Equation (2) above is used to calculate the lag L at the cutting speed U on a straight line as calculated with equation (1) from the finish quality value chosen in step 3 of Table 1, the material thickness, and a constant chosen from a table based on the strength of the jet and the cutting index of the material.

Corners and Curves

When the jet traverses a curve or executes a sharp corner, the lag causes an error in following the true line because the exit point at the bottom of the material is not above the entry point at the top of the material. This error is illustrated in FIGS. 7 and 8. As the traverse speed is lowered, the lag and the associated error is reduced. The question is what error is consistent with the chosen quality level for the surface of the cut.

It has been observed that the side to side flopping of the jet in a straight line cut is about 10% of the lag amount. A permissible error on curves and corners is chosen consistent with this observation according to table 4.

TABLE 4

| Finish | Error Limit (E) |
|---|---|
| 1 or less | no limit |
| 2–4 | .10*L, but not less than .001" |
| 5 | .001" | where, in the table, L is the lag calculated for straight line cutting using equation 2.

Given a permitted error 46 or 48 shown in FIGS. 7 and 8 taken from Table 4 above, the maximum permissible lag 45 ($L_M$) for a corner or curve may be calculated as follows. For a sharp corner, where the direction changes by angle A, the maximum permissible lag, $L_M$, is calculated from error limit E as shown in Table 4 above by:

$$L_M = E/\sin A \tag{3}$$

For an arc of radius R, the maximum permissible lag, $L_M$, is calculated from error limit E as shown in Table 4 above by:

$$L_M = ((R+E)^2 - R^2) \tag{4}$$

Using the maximum permissible lag, the system calculates the maximum speed, $U_M$, by:

$$U_M = (L_M*KNM/0.182H^2)1.15 \tag{5}$$

Velocity Change Limit

The inventor has observed that, even when velocity limits based on desired quality are not exceeded, a large acceleration up to this velocity limit will cause undesirable marks on the part. The limiting factor is the rate of change of lag length with distance along the curve, dL/dS. It has been found by experiment that dL/dS of 1.0 produces marks on the cut in a straight line cut. Reducing the value to 0.1 eliminates these marks, and no ill effects are found by reducing the value to 0.01. Use of this lower value to limit the rate of acceleration after slowly cutting a sharp corner prevents the tail from deflecting into material not intended to be cut.

Using a maximum rate of change of lag length with distance along the curve, dL/dS, of 0.01, the maximum spacial acceleration is calculated for each material and tool configuration by:

$$dV/dS = (KNM*U^{0.13}/6.32H^2)\, dL/dS$$

This maximum acceleration is used to limit velocities during calculation as described in relation to FIGS. 5(B) and 5(C).

I claim:

1. A method for achieving a desired trajectory of an object within a system, the object driven by at least one motor of the system with a drive circuit for the motor, and providing to the system a desired value associated with each portion of the trajectory, which trajectory begins with zero velocity at a starting point and ends with zero velocity at an ending point, comprising:

(a) specifying the desired trajectory as a series of incremental motor commands for the motor, each increment for the motor being one of: zero, positive increment, or negative increment;

(b) for each motor command, specifying an associated value which value relates to the portion of the trajectory specified by the motor command;

(c) storing the entire series of motor commands and associated values in a memory; and (d) sending to the motor drive circuit each motor command and providing the specified associated value to the system.

2. The method of claim 1 wherein the associated value represents a desired velocity at the portion of the trajectory specified by the motor command.

3. The method of claim 2 further comprising:

(a) as the series of motor commands is sent to the motor drive circuit, causing a delay between the sending of a first motor command and a successive motor command, the amount of delay derived from the value associated with one of the first motor command and the successive motor command, which combination of motor commands and delay instruct the motor to cause the object to achieve the desired velocity.

4. The method of claim 3 wherein the associated value is specified as a value representing a desired time delay between the sending of the first motor command and the successive motor command.

5. The method of claim 4 in which each time delay value is specified as a number of timer ticks to wait to achieve the desired delay.

6. The method of claim 1 wherein the object is a tool head of the system and the value specifies a rate of action of the tool head.

7. The method of claim 6 wherein the tool head is a jet and the value specifies the pressure of the jet.

8. The method of claim 6 wherein the tool head turns and the value specifies the speed of turning.

9. A method for determining tool motion control commands for operation of a machine tool on a desired trajectory to achieve a desired quality of result, comprising:

(a) describing the desired trajectory as a series of one or more segment specifications;

(b) for a segment specification, specifying an associated value representing a desired quality of result for that segment;

(c) storing the segment specification and associated value in a memory;

(d) receiving an additional parameter which affects the quality of result;

(e) combing the associated value and the additional parameter to determine motion control commands provided to the machine tool to adjust velocity or acceleration to achieve the desired quality of result.

10. The method of claim 1 wherein the machine tool is a jet cutting tool and the desired quality is uniformity of resulting cut surface.

11. The method of claim 2 wherein the velocity is adjusted to limit side to side flopping of the jet to maintain the desired uniformity of resulting cut surface.

12. The method of claim 10 wherein the velocity is adjusted to limit lag error when the jet traverses a curve or corner to maintain the desired uniformity of resulting cut surface.

13. The method of claim 10 wherein the acceleration is limited to maintain the desired uniformity of resulting cut surface.

14. A system for achieving a desired trajectory of an object, the object being driven by at least one motor having a drive circuit for the motor, and for providing a desired value associated with each portion of the trajectory, which trajectory begins with zero velocity at a starting point and ends with zero velocity at an ending point, the system comprising:

(a) means for specifying the desired trajectory as a series of incremental motor commands for the motor, each increment for the motor being one of: zero, positive increment, or negative increment;

(b) means for specifying, for each motor command, a value associated with the motor command, which value relates to the portion of the trajectory specified by the motor command;

(c) a memory for storing the entire series of motor commands and associated values; and (d) means for retrieving each motor command and associated value from the memory, sending the motor command to the motor drive circuit, and providing the specified associated value to the system.

15. The system of claim 14 wherein the associated value represents a desired velocity at the portion of the trajectory specified by the motor command.

16. The system of claim 15, further comprising:

means for causing a delay between the sending of a first motor command and the successive motor command as the motor commands are sent to the motor drive circuit, the amount of delay being derived from the value associated with one of the first motor command and the successive motor command, which combination of motor commands and delay instruct the motor to cause the object to achieve the desired velocity.

17. The system of claim 16 wherein the associated value is specified as a value representing a desired time delay between the sending of the first motor command and the successive motor command.

18. The system of claim 17 in which each time delay value is specified as a number of timer ticks to wait to achieve the desired delay.

19. The system of claim 14 wherein the object is a tool head of the system and the value specifies a rate of action of the tool head.

20. The system of claim 19 wherein the tool head is a jet and the value specifies the pressure of the jet.

21. The system of claim 19 wherein the tool head turns and the value specifies the speed of turning.

22. A system for controlling lag between commanded position and actual position in a trajectory of an object driven by at least one motor with a drive circuit for the motor, which trajectory begins with zero velocity at a starting point and ends with zero velocity at an ending point, the system comprising:

means for specifying the trajectory as a series of segments, each segment specified by one or more motion commands, with a velocity command for each segment;

means for calculating an associated probable lag between commanded position and actual position for each segment and for adjusting the velocity command to reduce the lag;

a memory for storing the specified motion commands and associated velocity commands;

means for retrieving the specified motion commands and associated velocity commands from the memory; and means for instructing the drive circuit to effect the motion specified by each segment with the commanded velocity.

23. A system for determining tool motion control commands for operation of a machine tool on a desired trajectory to achieve a desired quality of result, the system comprising:

means for describing the desired trajectory as a series of one or more segment specifications;

means for specifying a value associated with a segment specification, the associated value representing a desired quality of result for that segment;

a memory for storing the segment specification and associated value;

means for receiving an additional parameter which affects the quality of result; and means for combining the associated value and the additional parameter to determine motion control commands provided to the machine tool to adjust velocity or acceleration to achieve the desired quality of result.

24. The system of claim 23 wherein the machine tool is a jet cutting tool and the desired quality is uniformity of resulting cut surface.

25. The system of claim 24 wherein the velocity is adjusted to limit side to side flopping of the jet to maintain the desired uniformity of resulting cut surface.

26. The system of claim 24 wherein the velocity is adjusted to limit lag error when the jet traverses a curve or corner to maintain the desired uniformity of resulting cut surface.

27. The system of claim 24 wherein the acceleration is limited to maintain the desired uniformity of resulting cut surface.

* * * * *

UNITED STATES PATENT AND TRADEMARK OFFICE
CERTIFICATE OF CORRECTION

PATENT NO.  : 5,508,596
DATED       : April 16, 1996
INVENTOR(S) : John H. Olsen It is certified that error appears in the above-indentified patent and that said Letters Patent is hereby corrected as shown below:

Column 17, line 27, "combing" should be --combining--.

Column 17, line 31, "1" should be --9--.

Column 17, line 34, "2" should be --10--.

Signed and Sealed this

Eleventh Day of February, 1997

Attest:

BRUCE LEHMAN

Attesting Officer        Commissioner of Patents and Trademarks